T. GOLDE.
VEHICLE HOOD.
APPLICATION FILED AUG. 4, 1911.

1,034,901.

Patented Aug. 6, 1912.

UNITED STATES PATENT OFFICE.

TRAUGOTT GOLDE, OF GERA, GERMANY.

VEHICLE-HOOD.

1,034,901.　　　　Specification of Letters Patent.　　Patented Aug. 6, 1912.

Application filed August 4, 1911.　Serial No. 642,255.

*To all whom it may concern:*

Be it known that I, TRAUGOTT GOLDE, a subject of the Prince of Reuss, Younger Line, residing at Gera, Reuss, Germany, have invented a new and Improved Vehicle-Hood, of which the following is a specification.

This invention relates to a vehicle hood for automobiles and similar vehicles, which is readily foldable and is braced in a novel and efficient manner.

Figure 1:
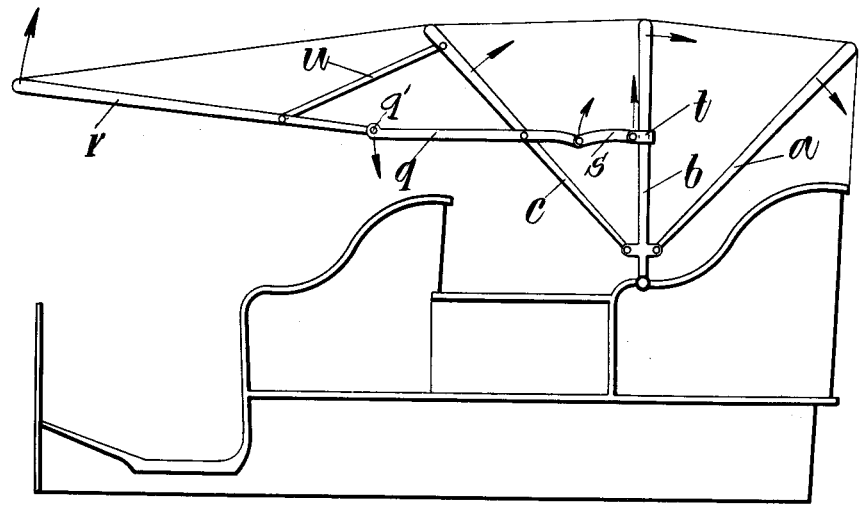

In the accompanying drawing: Figure 1 is a side view of a vehicle hood embodying my invention showing it open, and Fig. 2 a similar view showing it folded.

The hood comprises essentially three rear bows $a$, $b$ and $c$ of which the central bow $b$ is pivoted to the vehicle body while bows $a$ and $c$ are pivoted to bow $b$. Upon bow $b$ there is fitted a slide or runner $t$ to which is pivoted the rear end of a link $s$, the front end of which is pivoted to a rod $q$. This rod is pivotally connected at $q'$ to the foremost rear bow $c$ and carries at its front end the pivoted outrigger bow $r$. A diagonal strut $u$ connects bow $c$ at a point above pivot $q'$ with outrigger bow $r$.

Figure 2:
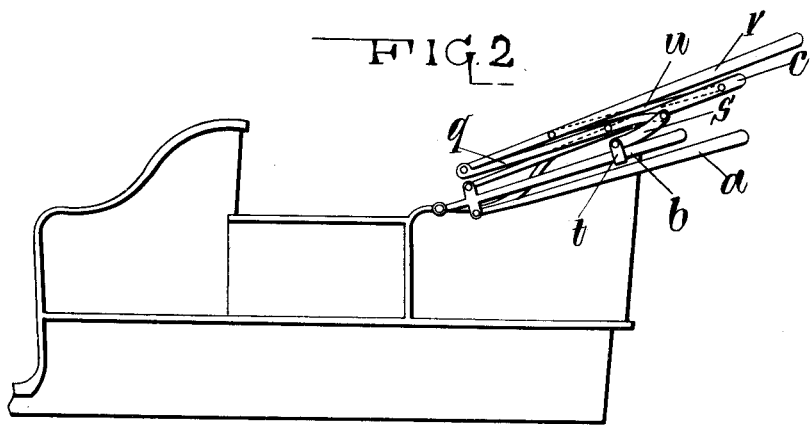

It will be seen that by the construction described, the top is thoroughly braced, and that it may be readily folded in the manner shown in Fig. 2.

I claim:

1. A vehicle hood comprising a pair of rear bows, a runner slidable on the rearmost of said bows, a link pivoted to the runner, a rod pivoted to the link and also to the foremost bow, and an outrigger bow pivoted to the rod.

2. A vehicle hood comprising a pair of rear bows, a runner slidable on the rearmost of said bows, a link pivoted to the runner, a rod pivoted to the link and also to the foremost bow, an outrigger bow pivoted to the rod, and a diagonal strut connecting the foremost bow above the rod with the outrigger bow.

In testimony whereof I affix my signature in the presence of two witnesses.

TRAUGOTT GOLDE.

Witnesses:
J. STEPHAN,
CHARLES NEUER.